Oct. 19, 1926.

E. M. GREEN 1,604,038

AUTOMOBILE EXHAUST HEATER

Filed April 11, 1924    2 Sheets-Sheet 1

E. M. Green
INVENTOR

BY Victor J. Evans
ATTORNEY

WITNESSES

Oct. 19, 1926.       1,604,038
E. M. GREEN
AUTOMOBILE EXHAUST HEATER
Filed April 11, 1924        2 Sheets-Sheet 2
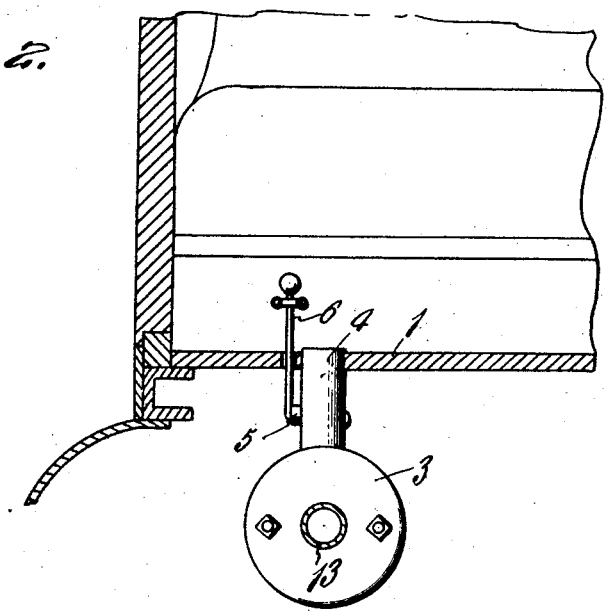
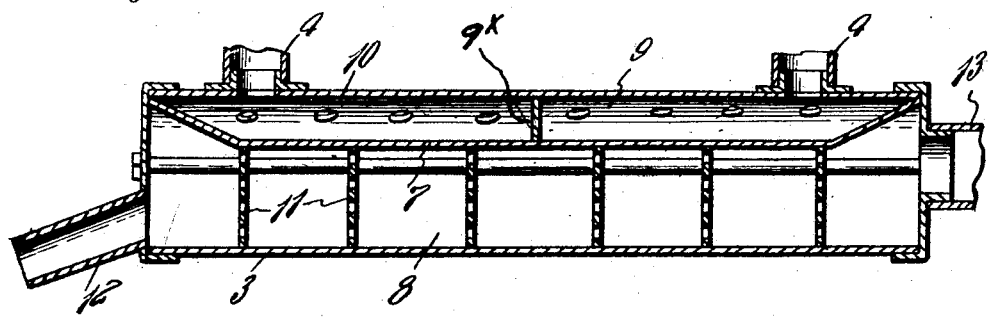
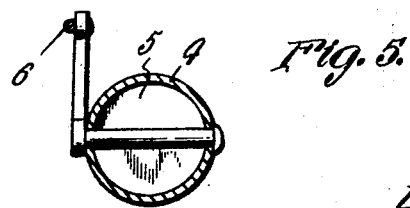

Patented Oct. 19, 1926.

1,604,038

UNITED STATES PATENT OFFICE.

ESTEL MAY GREEN, OF BEEBE, WASHINGTON.

AUTOMOBILE EXHAUST HEATER.

Application filed April 11, 1924. Serial No. 705,885.

The object of my said invention is the provision of a simple and easily applied device for utilizing advantageously the heat given off by the exhaust of the internal combustion engine of an automobile to heat the interior of the automobile, the amount of heat supplied to the said interior being susceptible of ready regulation by an occupant of the automobile.

To the attainment of the foregoing, the invention consists in the improvement as hereinafter described and definitely claimed.

In the accompanying drawings, forming part of this specification:—

Figure 2 is an enlarged detail section taken in the plane indicated by the line 2—2 of Figure 1, and showing the relation of my novel heater to the interior of the automobile body.

Figure 4 is a longitudinal vertical section of my novel heater per se.

Figure 5 is a detail horizontal section taken in the plane indicated by the line 5—5 of Figure 3.

Similar numerals designate corresponding parts in all of the views of the drawings.

Figure 1:
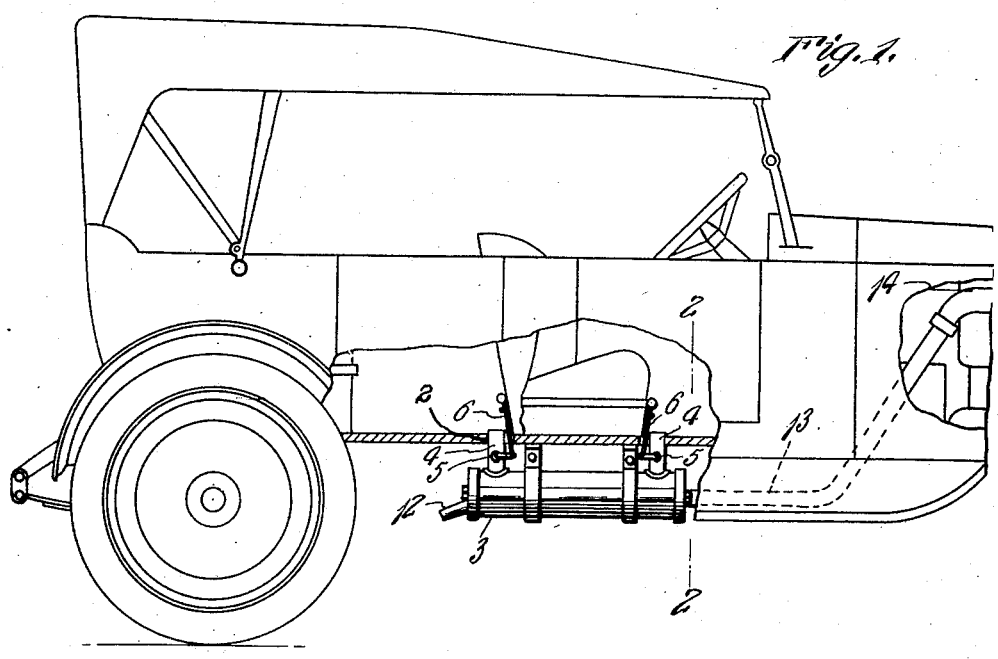
Figure 1 is a side elevation, partly broken, showing an automobile equipped with the heater constituting the preferred embodiment of my invention.
Figure 3:
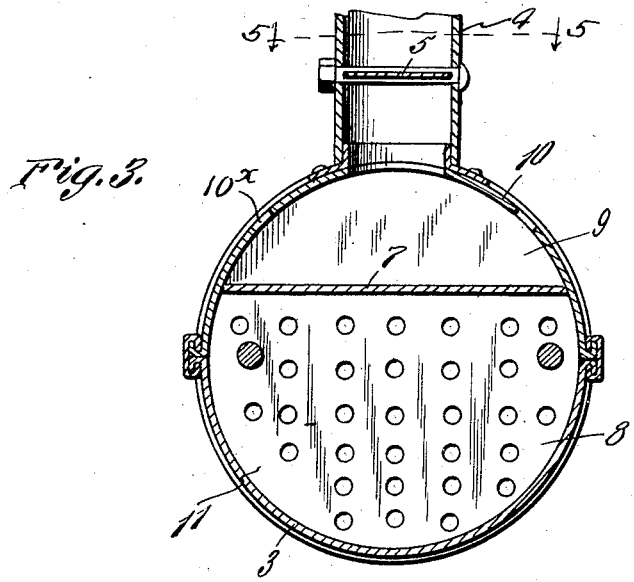
Figure 3 is a cross-section showing the upper and lower chambers in the heater body and one foraminous diaphragm in the lower chamber.

As shown in Figures 1 and 2 my novel heater is arranged in horizontal position and longitudinally of the automobile below the floor of the body thereof, the said floor being designated by 1 and being provided with openings 2 as illustrated.

The novel heater is made up of a cylindrical body 3 and conduits 4 extending upwardly from said body at points adjacent to the ends thereof and through said openings 2 so as to discharge hot air into the interior of the automobile body. In the said upright conduits 4 are dampers 5 adjustable through the medium of handle rods 6 which extend through the floor 1 as illustrated.

The heater body 3 is divided by a horizontal partition wall 7 into a main lower chamber 8 and a main upper chamber 9; the upper chamber 9 being provided in its wall 10 with foraminations 10ˣ, for the entry of atmospheric air and being in full and free communication with the conduits 4, and the lower chamber 8 being provided at intervals of its length with crosswise foraminous diaphragms 11 to provide horizontal parallel chambers as shown and the end chambers are provided with upwardly inclined top walls which form the ends of the horizontal partition 7 as clearly shown in Figure 4 of the drawings, therefore, the end chambers are relatively larger than the intermediate chambers. By this construction maximum heat is obtained for the heater from the exhaust gases as will be readily apparent.

At one end the chamber 8 is provided with a discharge nozzle 12, and its opposite end is connected through the medium of a conduit 13 with the exhaust manifold of the internal combustion engine 14. From this it follows that the lower chamber 8 of the heater body is adapted to serve as a muffler in addition to utilizing the hot products of combustion to heat the atmospheric air which passes through the upper chamber 9 and up through the conduits 4 when the valves 5 are open.

In the preferred embodiment of my invention, the muffler and heater is relatively arranged as shown in Figure 1 to the front and rear portions of an automobile body, and in order to promote even heating of both portions the chamber 9 is divided into front and rear compartments by a transverse diaphragm or partition 9ˣ, Figure 4.

It will be apparent from the foregoing that notwithstanding the simplicity and compactness of my novel device it constitutes an efficient muffler and heater; also, that by adjusting the dampers 5 the heat supplied to the interior of the automobile body may be nicely regulated by an occupant of the automobile or entirely cut off, as conditions demand.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patents, is:—

An automobile exhaust heater comprising a body, a horizontal partition wall dividing the body into a lower main chamber and an upper main chamber, the upper main chamber having a foraminous portion for the admission of atmospheric air and the lower main chamber having an intake for products of combustion at its forward end and discharge for such products at its rear end and also having spaced foraminous diaphragms at intervals of its length and disposed transversely to provide parallel chambers, the end portions of the horizontal partition being upwardly inclined to enlarge the end chambers in the lower main chamber, a transverse partition in the upper main chamber, and upright conduits communicating with the upper main chamber at opposite sides of said transverse partition and being equipped with dampers and damper adjusting means.

In testimony whereof I affix my signature.

ESTEL MAY GREEN.